(12) United States Patent
Hoshi

(10) Patent No.: US 7,466,496 B2
(45) Date of Patent: Dec. 16, 2008

(54) ZOOM LENS AND IMAGE PICKUP APPARATUS HAVING THE SAME

(75) Inventor: Koji Hoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 11/755,384

(22) Filed: May 30, 2007

(65) Prior Publication Data

US 2007/0279763 A1 Dec. 6, 2007

(30) Foreign Application Priority Data

May 31, 2006 (JP) .............................. 2006-151545

(51) Int. Cl.
*G02B 15/14* (2006.01)
(52) U.S. Cl. ...................... 359/687; 359/684
(58) Field of Classification Search .................. 359/684, 359/687
See application file for complete search history.

(56) References Cited

U.S. PATENT DOCUMENTS

| | | | |
|---|---|---|---|
| 5,285,316 A * | 2/1994 | Miyano et al. | 359/676 |
| 5,739,961 A * | 4/1998 | Nakayama et al. | 359/687 |
| 5,784,205 A * | 7/1998 | Nakayama et al. | 359/687 |
| 6,473,231 B2 | 10/2002 | Hamano | |
| 6,606,194 B2 | 8/2003 | Hamano | |

FOREIGN PATENT DOCUMENTS

| | | |
|---|---|---|
| JP | 07-128619 | 5/1995 |
| JP | 11-237550 | 8/1999 |
| JP | 2000-28922 A | 1/2000 |
| JP | 2001-305426 A | 10/2001 |
| JP | 2002-244037 | 8/2002 |
| JP | 2003-322795 | 11/2003 |

* cited by examiner

*Primary Examiner*—Ricky L Mack
*Assistant Examiner*—James R Greece
(74) *Attorney, Agent, or Firm*—Canon U.S.A., Inc., IP Divison

(57) ABSTRACT

A zoom lens includes: a first lens unit of positive refractive power; a second lens unit of negative refractive power; a third lens unit of positive refractive power; and a fourth lens unit of positive refractive power, being disposed in that order from an object side to an image side, in which the second and fourth lens units are moved in a direction parallel with an optical axis of the zoom lens during zooming, the first lens unit consists of one negative lens and three or fewer positive lenses, being disposed in that order from the object side to the image side, and the following condition is satisfied:

$$25.1 < Z \times BD1/BD2 < 4.1 \times Z,$$

where BD1 and BD2 are lengths of the first and second lens units along the optical axis, and Z is a zoom ratio.

10 Claims, 10 Drawing Sheets

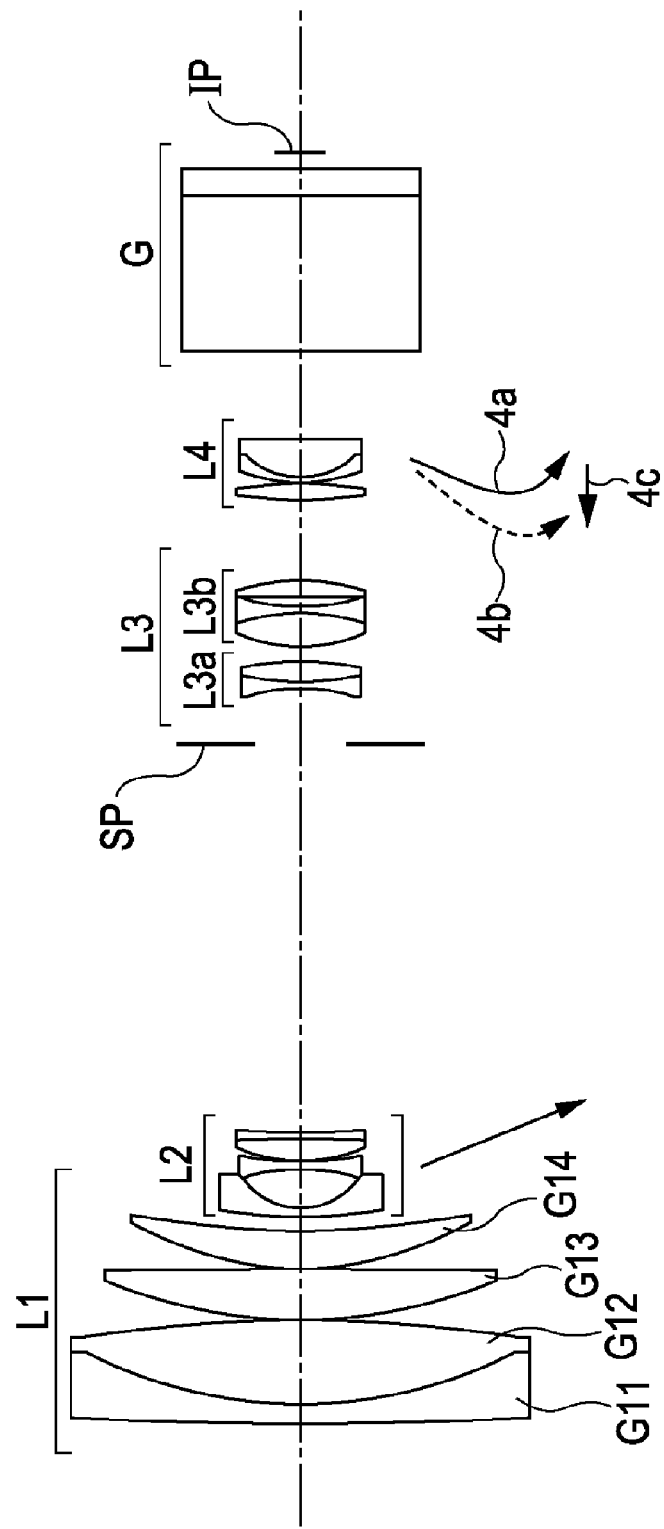

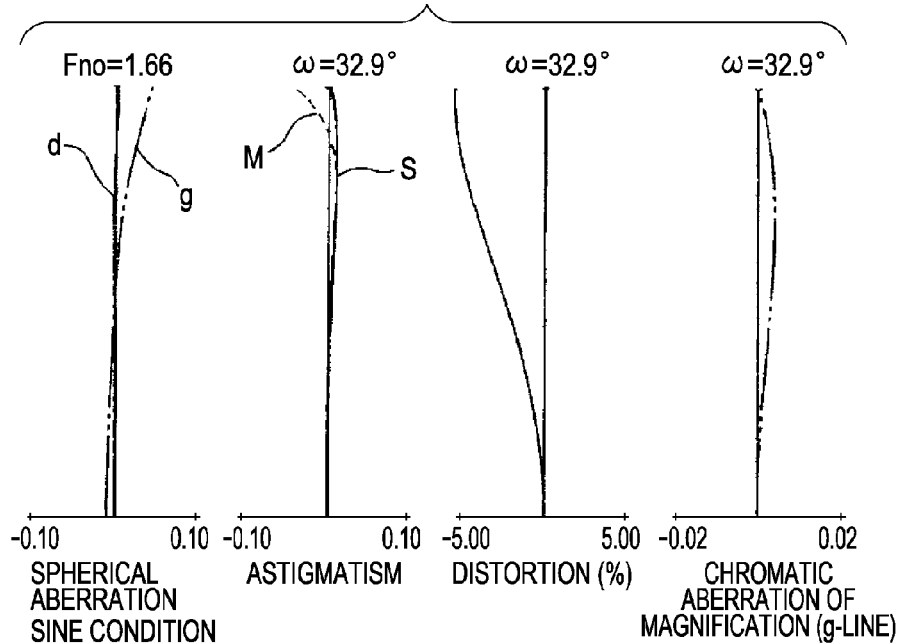
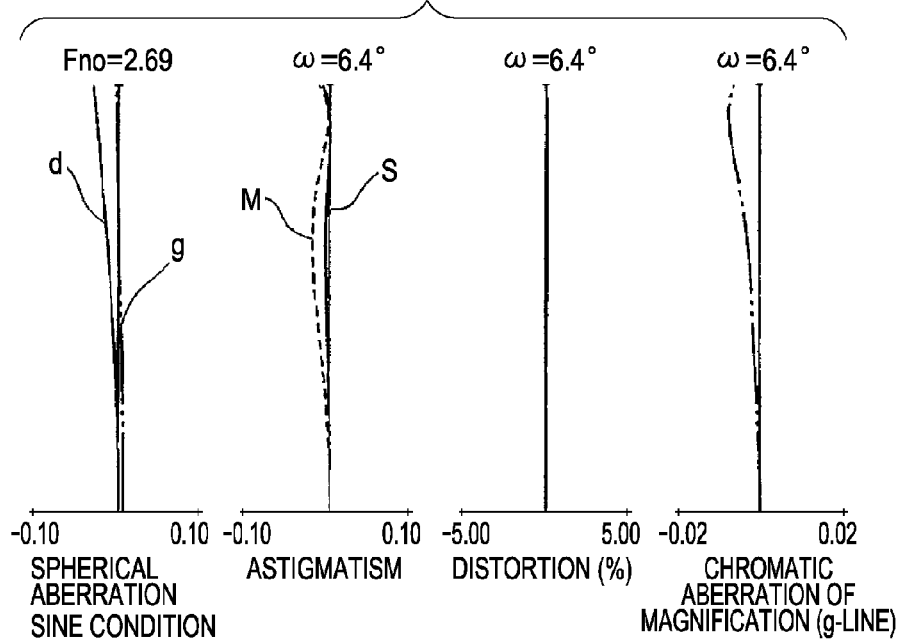

ZOOM LENS AND IMAGE PICKUP APPARATUS HAVING THE SAME

BACKGROUND OF THE INVENTION

1. Field of the Invention

The present invention relates to zoom lenses. In particular, the present invention relates to a zoom lens useful as an imaging optical system for video cameras, cameras for silver-halide photographs, digital cameras, and the like.

2. Description of the Related Art

Recently, zoom lenses are required to be compact and provide a high-resolution optical performance, to serve as an imaging optical system for an image pickup apparatus, such as a video camera, and a digital still camera, which uses a solid-state image pickup element.

Also, such a zoom lens is required to have an image stabilizing function for preventing a blur of a captured image caused by a shake applied to the zoom lens when an object image is captured.

To meet these demands, the zoom lens may be a four-unit structure having a first lens unit of positive refractive power, a second lens unit of negative refractive power, a third lens unit of positive refractive power, and a fourth lens unit of positive refractive power, the lens units being disposed in that order from an object side to an image side. There is provided a configuration that the second and fourth lens units of such a four-unit zoom lens are moved during zooming, and one of the lens units is shifted for correcting the image blur. In this configuration of the zoom lens, the third lens unit is divided into a lens sub-unit of negative refractive power and a lens sub-unit of positive refractive power. The lens sub-unit of positive refractive power is vibrated in a direction orthogonal to the optical axis thereof, to obtain a still image. For example, such a zoom lens is disclosed in U.S. Pat. No. 6,473,231, and Japanese Patent Laid-Open Nos. 7-128619, 2002-244037, and 2003-322795.

In general, an amount of movement of each lens unit for zooming is decreased as the refractive power of each lens unit in the zoom lens is increased. Accordingly, the entire lens system can be downsized. However, it is difficult to obtain a high optical performance because of increased variation in aberration.

In particular, to obtain a high zoom ratio, the effective diameter of the first lens unit is increased, and thus, the total length of the lenses is increased, this causes the entire lens system to be enlarged.

SUMMARY OF THE INVENTION

The present invention provides a zoom lens having a high zoom ratio and a high optical performance over the entire zooming range, and an image pickup apparatus having the zoom lens.

According to an aspect of the present invention: a first lens unit of positive refractive power; a second lens unit of negative refractive power; a third lens unit of positive refractive power; and a fourth lens unit of positive refractive power, being disposed in that order from an object side to an image side. In the zoom lens, the second and fourth lens units are moved in a direction parallel with an optical axis of the zoom lens during zooming, the first lens unit consists of one negative lens and three or fewer positive lenses, being disposed in that order from the object side to the image side, and the following condition is satisfied:

$$25.1 < Z \times BD1/BD2 < 4.1 \times Z,$$

where BD1 and BD2 are lengths of the first and second lens units along the optical axis, and Z is a zoom ratio.

According to another aspect of the present invention, an image pickup apparatus includes: a solid-state image pickup element; and a zoom lens arranged to form an image of an object on the solid-state image pickup element. In the apparatus, the zoom lens includes: a first lens unit of positive refractive power; a second lens unit of negative refractive power; a third lens unit of positive refractive power; and a fourth lens unit of positive refractive power, being disposed in that order from an object side to an image side. Also, the second and fourth lens units are moved in a direction parallel with an optical axis of the zoom lens during zooming, the first lens unit consists of one negative lens and three or fewer positive lenses, being disposed in that order from the object side to the image side, and the following condition is satisfied:

$$25.1 < Z \times BD1/BD2 < 4.1 \times Z,$$

where BD1 and BD2 are lengths of the first and second lens units along the optical axis, and Z is a zoom ratio.

Further features of the present invention will become apparent from the following description of exemplary embodiments with reference to the attached drawings.

BRIEF DESCRIPTION OF THE DRAWINGS

FIG. 1 is a cross-sectional view showing a zoom lens at a wide-angle end according to a first embodiment.

FIG. 2 is a diagram showing aberrations of the zoom lens at the wide-angle end according to the first embodiment.

FIG. 3 is a diagram showing aberrations of the zoom lens at an intermediate zooming position according to the first embodiment.

DESCRIPTION OF THE EMBODIMENTS

Figure 4:
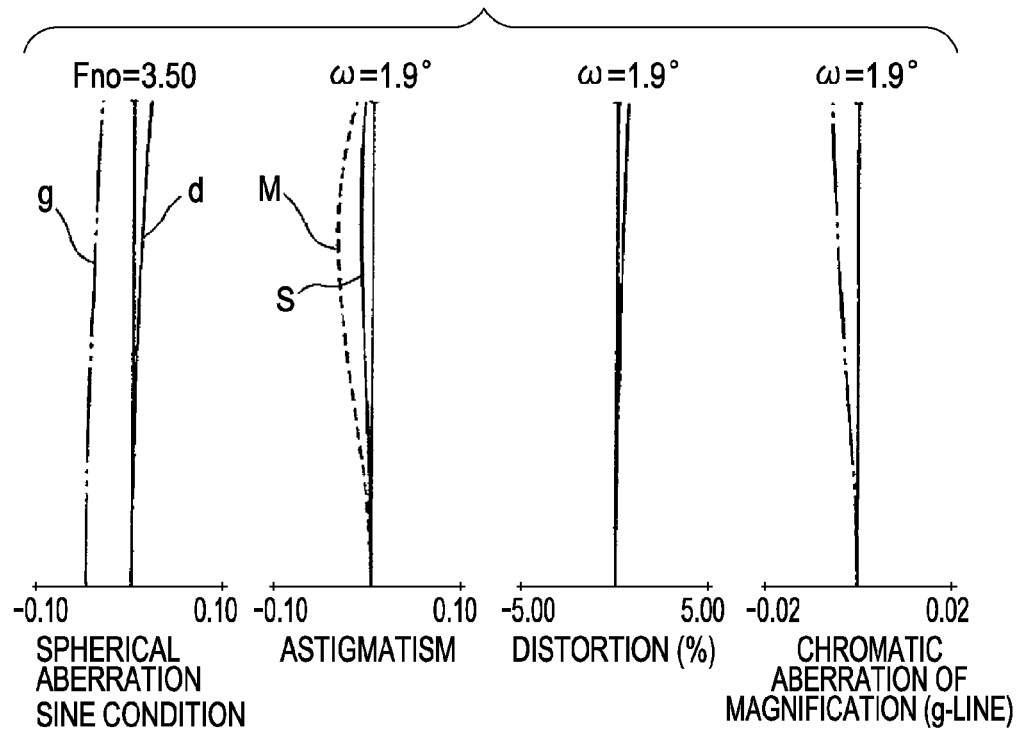
FIG. 4 is a diagram showing aberrations of the zoom lens at a telephoto end according to the first embodiment.

The exemplary embodiments provide a zoom lens having a high zoom ratio and a high optical performance over the entire zooming range, and an image pickup apparatus having the zoom lens.

The zoom lens is also utilized for image stabilization. A typical method of image stabilization is that one of lens units of the zoom lens is horizontally decentered in a direction orthogonal to the optical axis of the zoom lens. With this method, an additional optical system for the image stabilization is not necessary. However, a space is required in the optical path for moving the lens unit, and a decentration aberration may be generated at the image stabilization. In particular, with a zoom lens that performs the image stabilization by decentering the lens unit in the direction orthogonal to the optical axis, if an image shaking sensitivity and a zoom ratio are increased, then the decentration aberration is increased and hence, the optical performance is seriously decreased. It should be noted that when the lens unit is decentered, the lens unit may be moved in the direction orthogonal to the optical axis, or may be moved in an oblique direction with respect to the optical axis. Namely, the vector for the movement of the lens unit is only required to have a component in the direction orthogonal to the optical axis. Thus, the key points for the zoom lens with an image stabilization mechanism include a small deterioration in the optical performance at the correction of the image blur, and a reliable image shaking sensitivity.

The embodiments also provide a zoom lens having a compact optical system, and providing an image stabilizing function that keeps the quality of an image while the vibration is compensated, in addition to the advantages described above.

To achieve the advantages (especially, the former one), a zoom lens according to the first exemplary embodiment includes or consists of a first lens unit of positive refractive power, a second lens unit of negative refractive power, a third lens unit of positive refractive power, and a fourth lens unit of positive refractive power, the lens units being disposed in that order from an object side to an image side. The second and fourth lens units are moved in a direction parallel with the optical axis of the zoom lens during zooming. The first lens unit consists of one negative lens and three or fewer positive lenses, being disposed in that order from the object side to the image side. The above conditions are satisfied, and then the following conditional expression (1) is satisfied:

$$25.1 < Z \times BD1/BD2 < 4.1 \times Z \quad (1)$$

where BD1 and BD2 are lengths of the first and second lens units, respectively, along the optical axis, and Z is a zoom ratio.

With this configuration, the advantages of the zoom lens according to this embodiment can be achieved. So, the essential configuration of this embodiment is one described above. While embodiments of the zoom lens and the image pickup apparatus having the zoom lens of the present invention are described below with reference to the attached drawings, conditions and features described in the embodiments are merely examples, and it is clear that such conditions and features are not essential to the embodiments.

First Embodiment

FIG. 1 is a cross-sectional view showing a zoom lens at a wide-angle end according to a first embodiment. FIGS. 2, 3 and 4 are diagrams showing aberrations of the zoom lens at the wide-angle end, an intermediate zooming position, and a telephoto end according to the first embodiment when the zoom lens focuses on an object at infinity.

Figure 5:
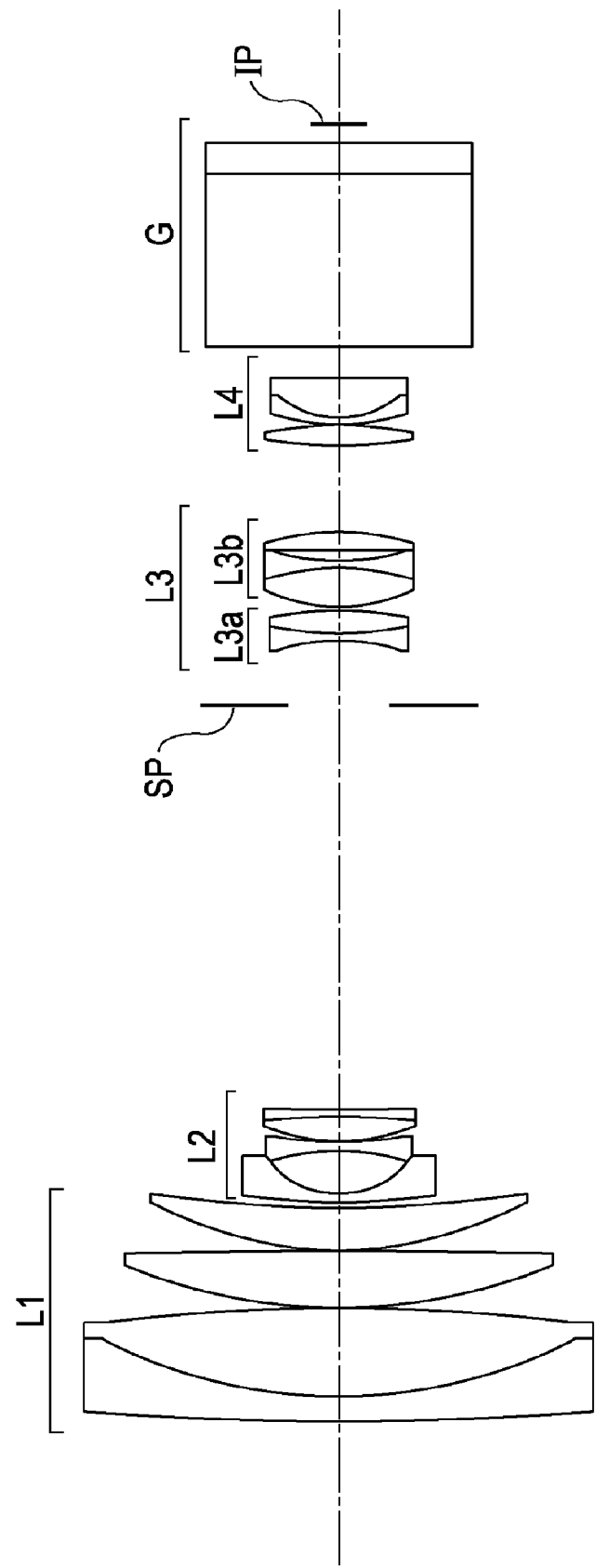
FIG. 5 is a cross-sectional view showing a zoom lens at a wide-angle end according to a second embodiment.
Figure 6:
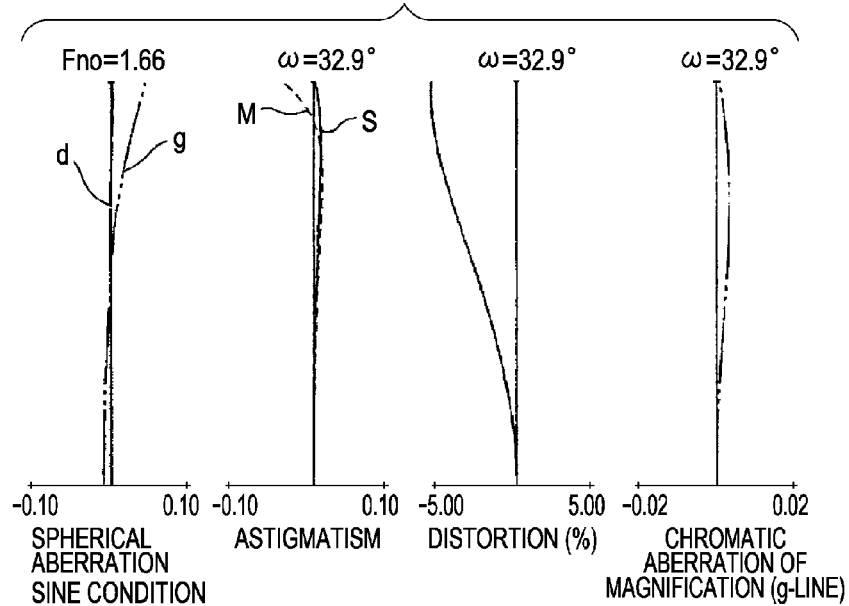
FIG. 6 is a diagram showing aberrations of the zoom lens at the wide-angle end according to the second embodiment.
Figure 7:
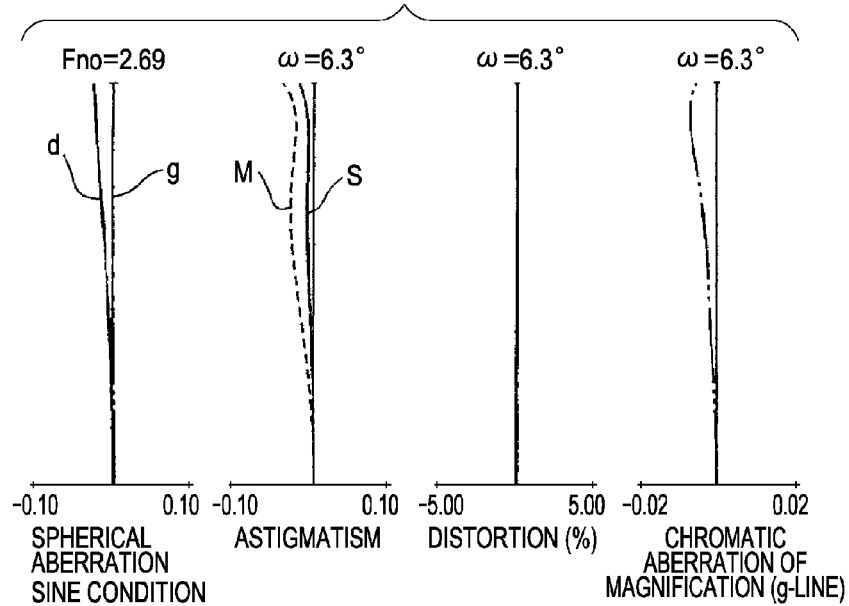
FIG. 7 is a diagram showing aberrations of the zoom lens at an intermediate zooming position according to the second embodiment.
Figure 8:
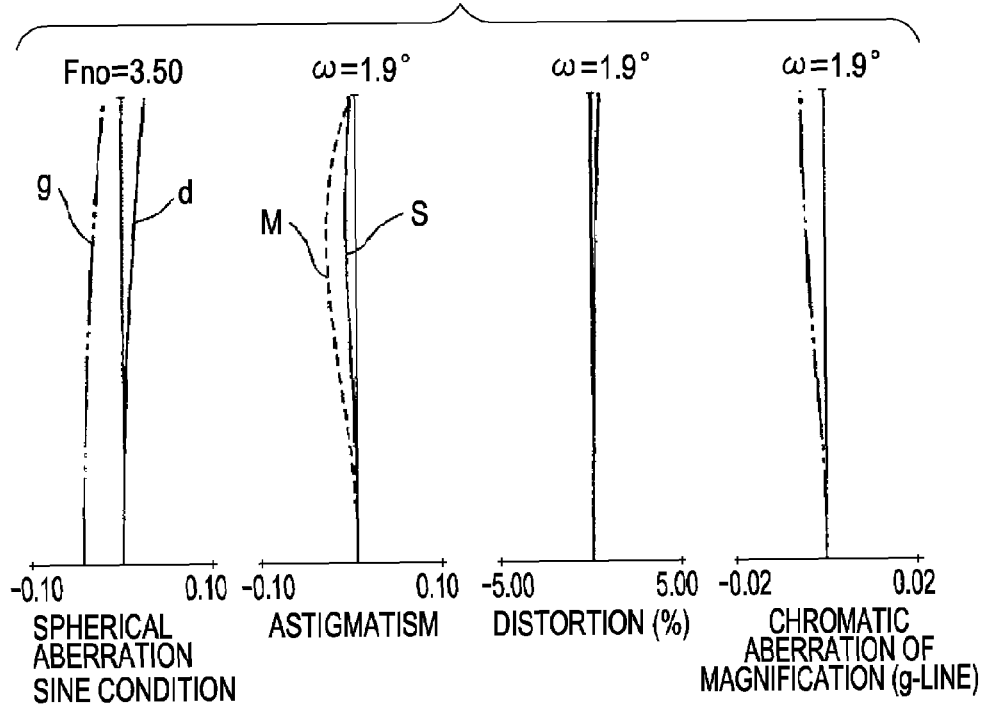
FIG. 8 is a diagram showing aberrations of the zoom lens at a telephoto end according to the second embodiment.

FIG. 5 is a cross-sectional view showing a zoom lens at a wide-angle end according to a second embodiment. FIGS. 6, 7 and 8 are diagrams showing aberrations of the zoom lens at the wide-angle end, an intermediate zooming position, and a telephoto end according to the second embodiment when the zoom lens focuses on an object at infinity.

Figure 9:
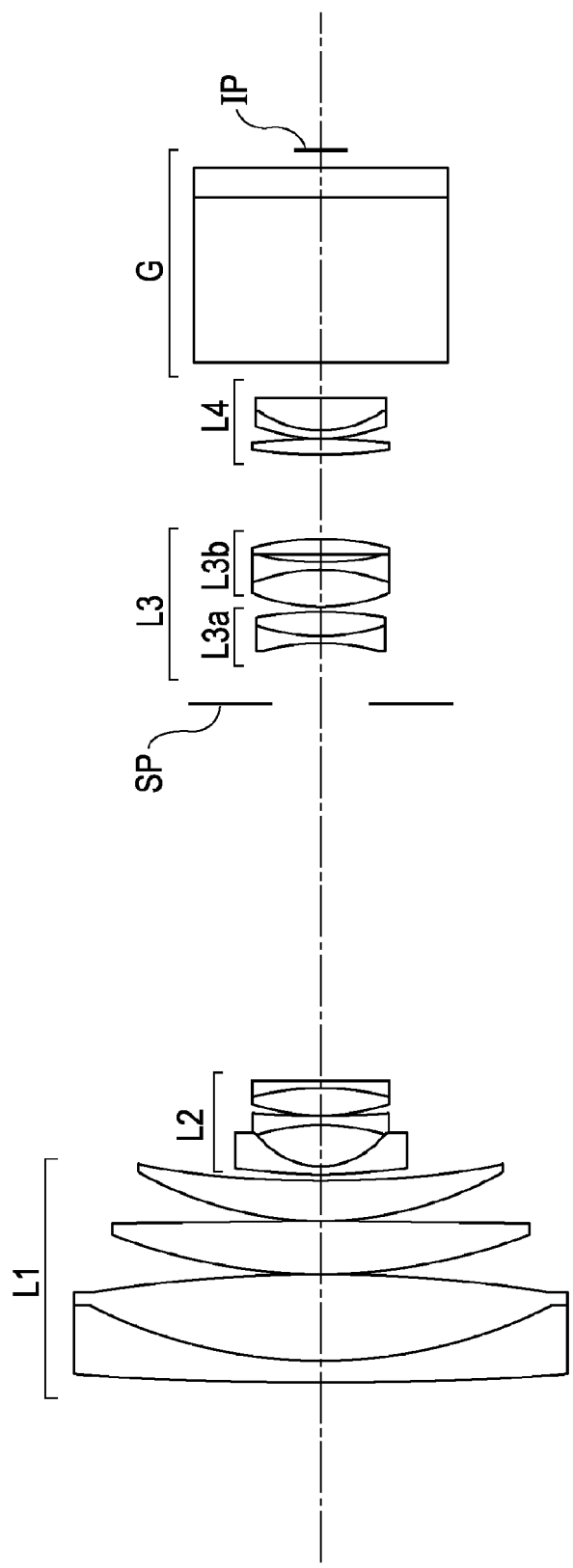
FIG. 9 is a cross-sectional view showing a zoom lens at a wide-angle end according to a third embodiment.
Figure 10:
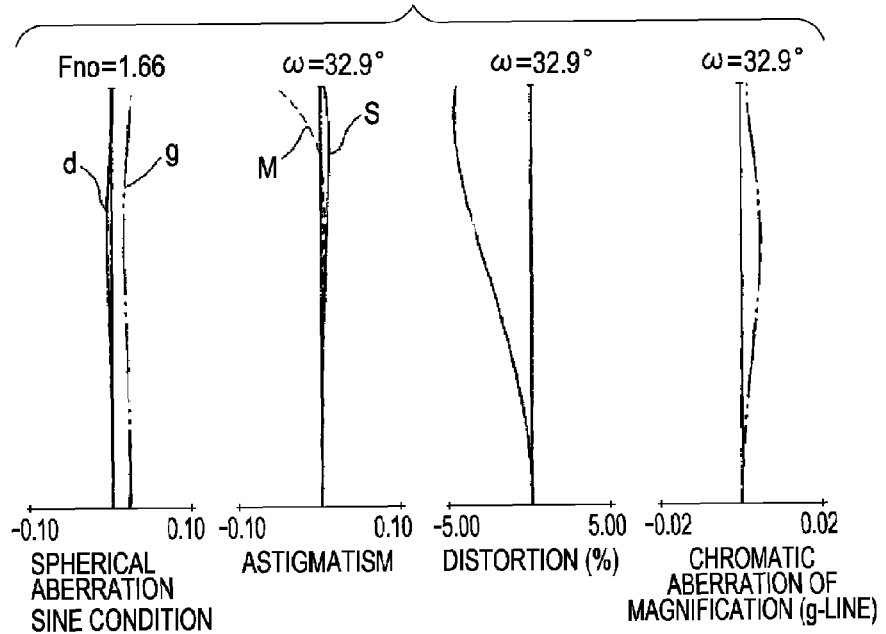
FIG. 10 is a diagram showing aberrations of the zoom lens at the wide-angle end according to the third embodiment.
Figure 11:
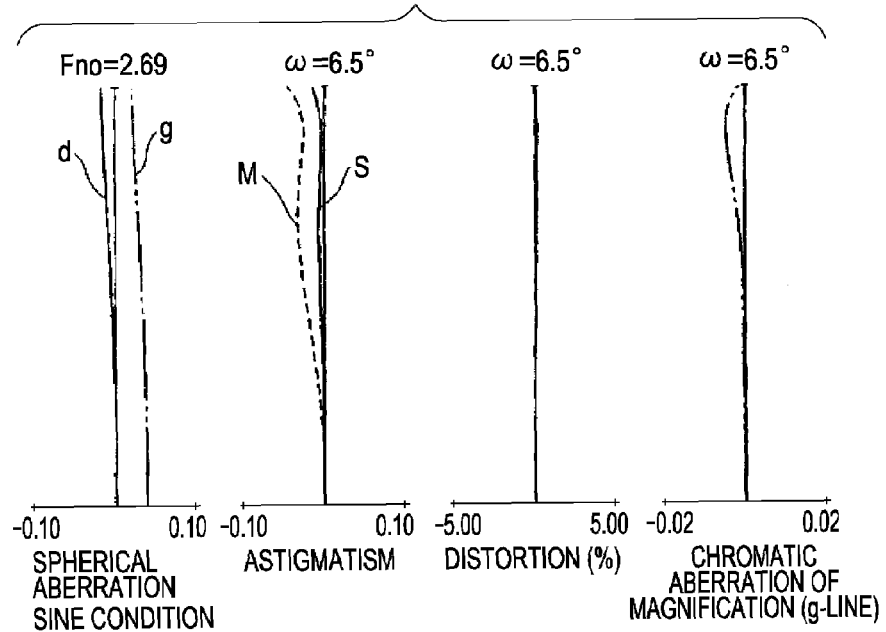
FIG. 11 is a diagram showing aberrations of the zoom lens at an intermediate zooming position according to the third embodiment.
Figure 12:
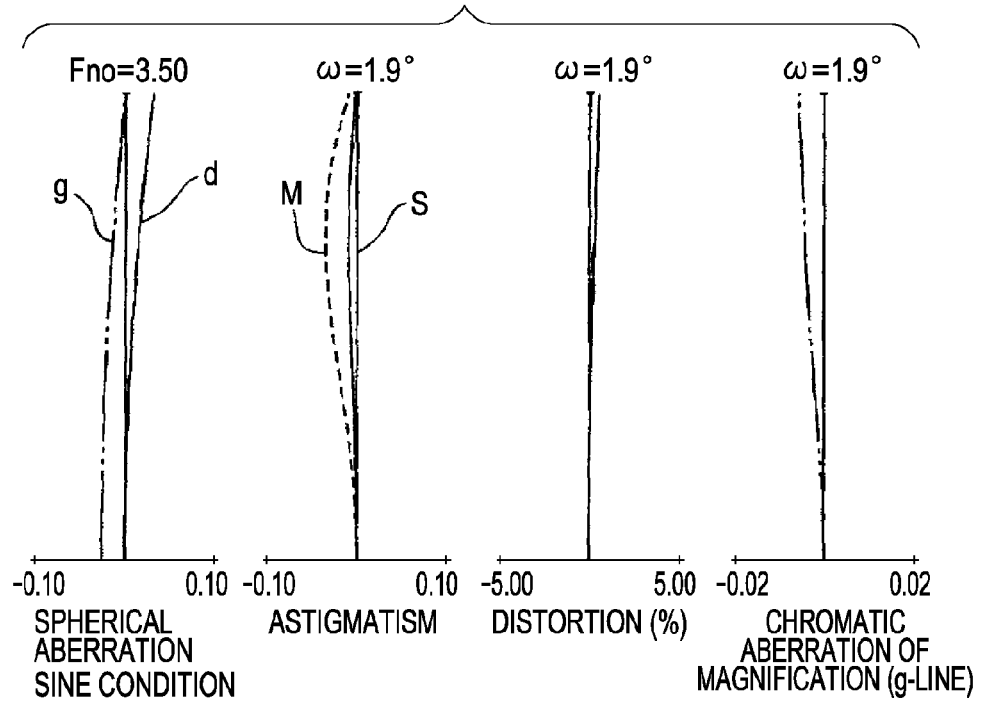
FIG. 12 is a diagram showing aberrations of the zoom lens at a telephoto end according to the third embodiment.

FIG. 9 is a cross-sectional view showing a zoom lens at a wide-angle end according to a third embodiment. FIGS. 10, 11 and 12 are diagrams showing aberrations of the zoom lens at the wide-angle end, an intermediate zooming position, and a telephoto end according to the third embodiment when the zoom lens focuses on an object at infinity.

Figure 13:
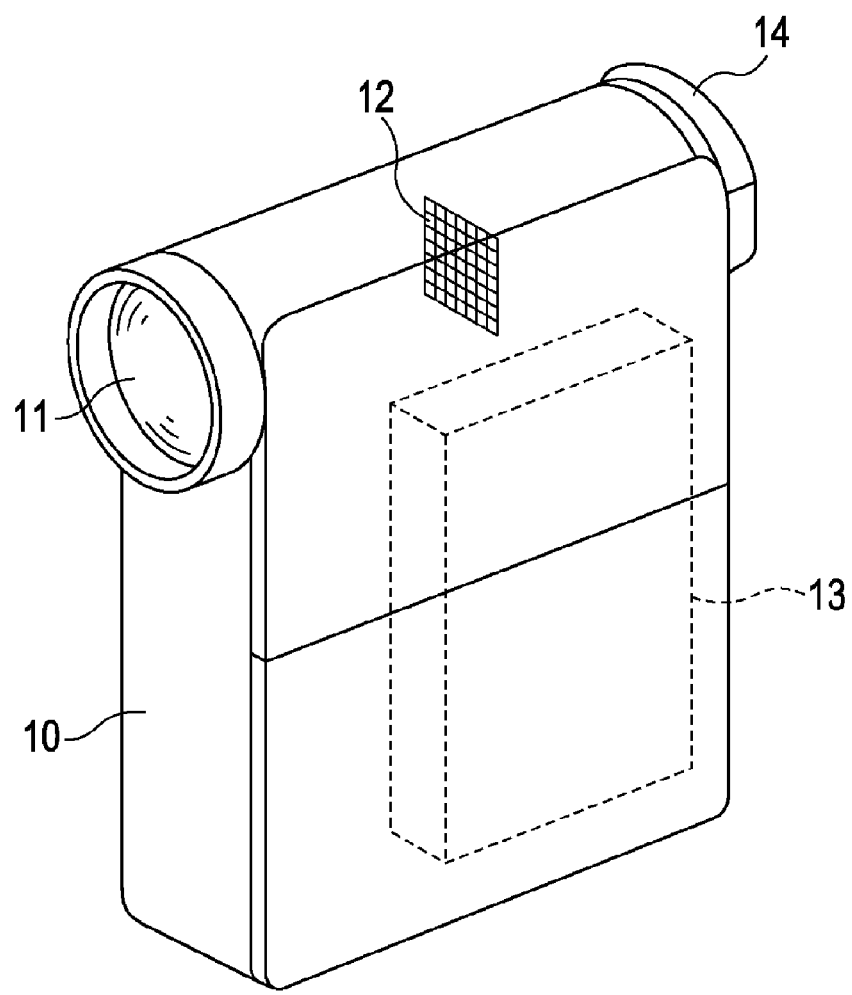
FIG. 13 is a schematic illustration showing a primary portion of an image pickup apparatus according to an exemplary embodiment of the present invention.

FIG. 13 is a schematic illustration showing a primary portion of a video camera (image pickup apparatus) having the zoom lens according to the exemplary embodiment of the present invention.

FIGS. 1, 5 and 9 each illustrate the cross-sectional view of lenses including a first lens unit L1 of positive refractive power (optical power=reciprocal of focal length), a second lens unit L2 of negative refractive power, a third lens unit L3 of positive refractive power, and a fourth lens unit L4 of positive refractive power.

The third lens unit L3 includes or consists of a third-a lens sub-unit L3a of negative refractive power and a third-b lens sub-unit L3b of positive refractive power. The third-b lens sub-unit L3b is moved in a direction orthogonal to the optical axis for image stabilization (adjustment of image shift). Alternatively, the movement for the image stabilization may be swing movement (rotational movement) about a point located on the optical axis. An image can be shifted in plane when the third-b lens sub-unit L3b for the image stabilization is moved in the direction orthogonal to the optical axis (or moved in a direction having a component which is orthogonal to the optical axis).

An optical block G corresponds to an optical filter, a faceplate, or the like. An image plane IP corresponds to an image pickup surface of a solid-state image pickup element (photoelectric conversion element) such as a charge coupled device (CCD) sensor or a complementary metal oxide semiconductor (CMOS) sensor when used for an imaging optical system of a video camera or a digital still camera, or the image plane IP corresponds to a film plane when used for a camera with silver-halide film. An aperture stop SP is provided on the object side of the third-a lens sub-unit L3a. The zoom lens according to this embodiment forms an object image on the solid-state image pickup element (referred to as IP), and the solid-state image pickup element detects the image so formed.

In the aberration diagram, d denotes the d-line, g denotes the g-line, M denotes a meridional image plane, and S denotes a sagittal image plane. A chromatic aberration of magnification is plotted in accordance with the g-line. FNo denotes an F-number, and ω denotes a half angle of view.

Hereinafter, in the embodiments, zooming positions at a wide-angle end and a telephoto end mean zooming positions that the zooming lens unit (in the embodiments, the second lens unit L2) is located at—namely opposite ends of a range of movement where the lens unit is mechanically movable on the optical axis.

In the embodiments, when the zooming position is varied from the wide-angle end to the telephoto end, the second lens unit L2 is moved to the image side for the zooming, and also the fourth lens unit L4 is moved along a locus partly including a portion protruding to the object side to correct an image plane variation caused by the zooming. The second and fourth lens units L2 and L4 may be moved at least in a direction parallel to the optical axis, and the vector in the direction of the movement may include a component in the direction orthogonal to the optical axis.

The zoom lens is a rear focus type in which the fourth lens unit L4 is moved along the optical axis for focusing. A solid curve 4a and a dotted curve 4b of the fourth lens unit L4 illustrate movement loci for correcting the image plane variation caused by the zooming from the zooming position at the wide-angle end and at the telephoto end when the zoom lens focuses on an object at infinity and an object at a short distance.

Since the fourth lens unit L4 is moved along the locus including the portion protruding to the object side, the space between the third and fourth lens units L3 and L4 are effectively used, thereby efficiently decreasing the total length of the lenses. The first and third lens units L1 and L3 do not move for the purposes of zooming and focusing.

In the embodiments, for instance, in order to perform the focusing from the object at infinity to the object at the short distance while the zooming position is located at the telephoto end, the fourth lens unit L4 is moved forward as indicated by an arrow 4c.

In the embodiments, the third-b lens sub-unit (image-stabilization lens unit) L3b is moved in a direction orthogonal to the optical axis to correct an image blur caused by vibration of the entire optical system.

That is, image stabilization is performed. Accordingly, image stabilization is performed without the necessity of adding another optical member such as a vari-angle prism, or an image-stabilization lens unit, which prevents an increase in size of the entire optical system.

In the embodiments, the first lens unit L1 consists of a negative lens and up to three positive lenses, being disposed in that order from the object side to the image side. This embodiment only discloses the first lens unit L1 consisting of one negative lens and three positive lenses, however, the number of the positive lenses may be one, two or three, as long as the number of the positive lenses is three or fewer.

In particular, the first lens unit L1 consists of a negative lens G11, a biconvex positive lens G12, a positive lens G13 having a convex surface on the object side, and a meniscus positive lens G14 having a convex surface on the object side, being disposed in that order from the object side to the image side.

The negative lens G11 and the positive lens G12 are affixed (cemented) to one another using an optical cement.

The second lens unit L2 includes or consists of a meniscus negative lens having a concave surface on the image side, a negative lens having a concave surface on the object side, a biconvex positive lens, and a negative lens, being disposed in that order from the object side to the image side.

With this lens arrangement, variation in the aberration of the second lens unit L2 is reduced for zooming.

The third lens unit L3 includes or consists of a third-a lens sub-unit L3a of negative refractive power and a third-b lens sub-unit L3b of positive refractive power, being disposed in that order from the object side to the image side.

Owing to this, a sufficient length is provided for the back focus.

The third-a lens sub-unit L3a includes or consists of a lens including a biconcave negative lens and a biconvex positive lens, being disposed in that order from the object side to the image side, and being affixed to one another using an optical cement.

The third-b lens sub-unit L3b includes or consists of a positive lens having an aspherical surface, a negative lens, and a positive lens.

It the embodiments, the positive lens having at least one aspherical surface is used in the third-b lens sub-unit L3b, so that a decentration aberration such as a decentration coma aberration caused by the image stabilization is reduced.

In addition, at least one negative lens is used in the third-b lens sub-unit L3b, so that a decentration chromatic aberration of magnification caused by the image stabilization may be corrected.

At this time, at least one positive lens is used in the third-a lens sub-unit L3a, so that the corrections of the chromatic aberrations in the entire third lens unit L3 can be balanced.

With the arrangement of the third-b lens sub-unit L3b, the number of components for the image stabilization lens unit, which corrects the image blur, is minimized. Accordingly, the image stabilization lens unit becomes compact, and light in weight.

Also, an actuator for driving the image stabilization lens unit becomes compact, and hence the entire apparatus becomes compact, and power consumption is saved when the actuator is driven.

The fourth lens unit L4 includes or consists of a biconvex positive lens, a meniscus negative lens having a concave surface on the image side, and a positive lens having a convex surface on the object side.

This arrangement may decrease the variation in aberration during focusing.

In the embodiments, at least one of the following conditions is satisfied. Accordingly, an advantage corresponding to each of the conditions is obtained.

The zoom ratio Z is expressed as follows:

$Z=fT/fw,$ where BD1 and BD2 are lengths of the first lens unit L1 and the second lens unit L2 along the optical axis (in each lens unit, a length between the lens surface closest to the object and the lens surface closest to the image), respectively, and Z is a zoom ratio; and then fw, fT are focal lengths at the wide-angle end and the telephoto end, respectively, based on the above definition.

The second lens unit L2 has a negative lens, and at least one positive lens G2p on the image side of the negative lens. Then, at least one of the following conditions are satisfied:

$25.1<Z\times BD1/BD2<4.1\times Z$ (1)

$75<vdG12$ (2)

$65<vdG13$ (3)

$1.601<NdG14<1.811$ (4)

$vdG2p<23.5$ (5), where vdG12 and vdG13 are Abbe numbers of materials of the positive lenses G12 and G13 in the first lens unit L1, NdG14 is a refractive index of a material of the positive lens G14, and vdG2p is an Abbe number of a material of the positive lens G2p.

Next, the technical meanings of the conditional expressions are described.

The conditional expression (1) relates to the lengths of the first and second lens units L1 and L2, and the zoom ratio. If a value is below the lower limit of the conditional expression (1), then the length of the first lens unit L1 is relatively small, or the length of the second lens unit L2 is relatively large. In the case where the value is below the lower limit of the conditional expression (1) since the length of the first lens unit L1 is small, it is difficult that the first lens unit L1 has a large positive refractive power. As a result, even when the second lens unit L2 is largely moved at the zooming, it is difficult to obtain a high zoom ratio.

In the case where the value is below the lower limit of the conditional expression (1) since the length of the second lens unit L2 is large, the lens diameter of the first lens unit L1 located on the object side is large as compared with that of the second lens unit L2. Thus, the lower limit of the conditional expression (1) may be greater than 25.1—in particular 32.1, and more particularly, 40.1.

If a value is above the upper limit of the conditional expression (1), then the length of the first lens unit L1 is markedly large. In the case where the value is above the upper limit of the conditional expression (1), the total length of the lenses is large, this causes the entire lens system to be disadvantageously large. The upper limit of the conditional expression (1) may be less than 4.1—in particular 3.3×Z, and more particularly, 2.6×Z.

According to each of the embodiments, the zoom ratio Z has a value as follows:

Z=19.8

The conditional expressions (2), (3), and (4) relate to the Abbe numbers of the materials of the positive lenses G12 and G13, and the refractive index of the material of the positive lens G14, provided in the first lens unit L1.

If values are below the lower limits of the conditional expressions (2) and (3), then it is difficult to reliably correct the longitudinal chromatic aberration and the chromatic aberration of magnification at the telephoto end.

If the refractive index is below the lower limit of the conditional expression (4), then the curvature of the lens surface is increased to hold a predetermined refractive power, and thus, it is difficult to correct a spherical aberration. If the refractive index is above the upper limit of the conditional expression (4), then a low-dispersion material may not be used, and thus, it is difficult to correct the chromatic aberration.

The conditional expression (5) relates to the Abbe number of the material of at least one positive lens G2p on the image side of the negative lens included in the second lens unit L2. If the dispersion is small, i.e., a value is above the upper limit of the conditional expression (5), then it is necessary to increase the curvature of the lens surface of the positive lens G2p and thus increase the refractive power for correcting a chromatic aberration in relation to the negative lens on the object side in the second lens unit L2. This increases the thickness of the positive lens G2p. Accordingly, the lens diameter of the first lens unit L1 is disadvantageously increased.

The positive lens G2p of the second lens unit L2 that satisfies the conditional expression (5) may be affixed to the negative lens. Accordingly, the chromatic aberration may be finely corrected by the lens including the negative lens and the positive lens G2p affixed to one another because the material of the positive lens G2p has extremely large dispersion.

The conditional expressions (1) to (5) may be the following conditional expressions (1a) to (5a):

$$40.0 (\text{or } 2.0 \times Z) < Z \times BD1/BD2 < 3.0 \times Z \quad (1a)$$

$$80 < vdG12 < 90 \quad (2a)$$

$$90 < vdG13 < 100 \quad (3a)$$

$$1.650 < NdG14 < 1.750 \quad (4a)$$

$$17.5 < vdG2p < 21.0 \quad (5a)$$

While this embodiment employs the zoom ratio of 19.8, the zoom ratio may range from 15 to 30, and more particularly, it may range from 18 to 22.

In each embodiment, a lens unit of a small refractive power may be added on the object side of the first lens unit L1 or on the image side of the fourth lens unit L4.

A teleconverter lens or a wide-converter lens may be disposed on the object side or the image side.

With each of the above embodiments, the zoom lens can have a zoom ratio as high as 20, allow the entire lens system to be compact, and provide a high optical performance.

With each of the embodiments, the distribution of the refractive powers and the lens arrangements of the lens units are determined appropriately, and the third-b lens sub-unit, which is included in the optical system and is relatively small and light weight, serves as an image stabilization lens unit. The third-b lens sub-unit is moved in the direction orthogonal to the optical axis, to correct the image blur caused by the vibration (tilting) of the zoom lens. Accordingly, the zoom lens can contribute to reduction in size of the entire optical system, simplification of the mechanism, reduction in load on a driving unit, and correction in the decentration aberration at the time when the lens unit is decentered.

With each of the embodiments, the zoom lens can be utilized for the image pickup apparatus such as a video camera or a digital still camera, have the zoom ratio as high as 20, and provide the reliable image stabilizing function.

Numerical Examples 1 to 3 corresponding to the first to third embodiments are shown below. In each Numerical Example, i denotes an order of the surface when counted from the object side, ri denotes a radius of curvature of an i-th order (i-th surface), di denotes a distance between the i-th surface and an (i+1)-th surface, ni and vi denote a refractive index and an Abbe number, respectively, of a material of the i-th optical member with reference to the d-line.

In Numerical Examples 1 to 3, the three surfaces closest to the image are planes corresponding to optical blocks. When X expresses a shift of a surface vertex along the optical axis at a height h from the optical axis, the profile of an aspherical surface of each of the planes is expressed as follows:

$$x = \frac{(1/R)h^2}{1 + \sqrt{\{1 - (1+k)(h/R)^2\}}} + Bh^4 + Ch^6 + Dh^8 + Eh^{10} + Fh^{12}$$

where R is a paraxial radius of curvature, k is a conic constant, and B, C, D, E and F are aspherical coefficients.

Note that "e-X" represents "×10⁻ˣ". f is a focal length, FNo is a F-number, and ω is a half angle of view.

Also, the relationship between the above conditional expressions and numerical values in each Numerical Example is shown in Table 1.

NUMERICAL EXAMPLE 1

| f = 4.63~91.65 FNo = 1: 1.66~3.50 2ω = 65.8°~3.7° | | | |
|---|---|---|---|
| r1 = 672.113 | d1 = 2.75 | n1 = 1.80610 | v1 = 33.3 |
| r2 = 61.176 | d2 = 10.43 | n2 = 1.49700 | v2 = 81.5 |

-continued

| f = 4.63~91.65 FNo = 1: 1.66~3.50 2ω = 65.8°~3.7° | | | |
|---|---|---|---|
| r3 = −183.319 | d3 = 0.28 | | |
| r4 = 66.731 | d4 = 6.57 | n3 = 1.43387 | ν3 = 95.1 |
| r5 = −1249.964 | d5 = 0.20 | | |
| r6 = 44.394 | d6 = 4.76 | n4 = 1.71300 | ν4 = 53.9 |
| r7 = 120.560 | d7 = Variable | | |
| r8 = 76.331 | d8 = 1.05 | n5 = 1.88300 | ν5 = 40.8 |
| r9 = 9.558 | d9 = 5.01 | | |
| r10 = −29.553 | d10 = 0.95 | n6 = 1.83481 | ν6 = 42.7 |
| r11 = 43.079 | d11 = 0.20 | | |
| r12 = 21.720 | d12 = 2.70 | n7 = 1.92286 | ν7 = 18.9 |
| r13 = −209.781 | d13 = 0.85 | n8 = 1.88300 | ν8 = 40.8 |
| r14 = 209.781 | d14 = Variable | | |
| r15 = ∞ (Aperture Stop) | d15 = 7.17 | | |
| r16 = −26.670 | d16 = 0.80 | n9 = 1.83481 | ν9 = 42.7 |
| r17 = 40.786 | d17 = 2.55 | n10 = 1.80518 | ν10 = 25.4 |
| r18 = −40.786 | d18 = 0.51 | | |
| r19 = 18.678 (Aspherical Surface) | d19 = 4.48 | n11 = 1.58313 | ν11 = 59.4 |
| r20 = −30.308 | d20 = 0.85 | n12 = 1.76200 | ν12 = 40.1 |
| r21 = 30.308 | d21 = 1.09 | | |
| r22 = 341.832 | d22 = 2.12 | n13 = 1.62299 | ν13 = 58.2 |
| r23 = −31.170 | d23 = Variable | | |
| r24 = 58.593 | d24 = 2.10 | n14 = 1.69680 | ν14 = 55.5 |
| r25 = −58.593 | d25 = 0.20 | | |
| r26 = 25.889 | d26 = 0.85 | n15 = 1.84666 | ν15 = 23.9 |
| r27 = 11.721 | d27 = 4.46 | n16 = 1.69680 | ν16 = 55.5 |
| r28 = 124.588 | d28 = Variable | | |
| r29 = ∞ | d29 = 20.00 | n17 = 1.58913 | ν17 = 61.1 |
| r30 = ∞ | d30 = 3.75 | n18 = 1.51633 | ν18 = 64.1 |
| r31 = ∞ | | | |

| | Focal Length | | |
|---|---|---|---|
| Variable Distance | 4.63 | 26.86 | 91.65 |
| d7 | 0.77 | 32.85 | 43.55 |
| d14 | 45.65 | 13.56 | 2.87 |
| d23 | 9.97 | 6.19 | 12.12 |
| d28 | 4.05 | 7.83 | 1.90 |

| Aspherical Coefficient | | | | | | |
|---|---|---|---|---|---|---|
| | K | B | C | D | E | F |
| 19-th Surface | −1.3294e+00 | 5.7322e−07 | 3.9077e−08 | −2.3492e−10 | 1.0376e−12 | 5.2479e−15 |

NUMERICAL EXAMPLE 2

| f = 4.63~91.59 FNo = 1: 1.66~3.50 2ω = 65.9°~3.8° | | | |
|---|---|---|---|
| r1 = 419.561 | d1 = 2.75 | n1 = 1.80610 | ν1 = 33.3 |
| r2 = 60.863 | d2 = 10.10 | n2 = 1.49700 | ν2 = 81.5 |
| r3 = −227.873 | d3 = 0.28 | | |
| r4 = 68.223 | d4 = 6.30 | n3 = 1.43387 | ν3 = 95.1 |
| r5 = −1387.644 | d5 = 0.20 | | |
| r6 = 44.899 | d6 = 4.75 | n4 = 1.69680 | ν4 = 55.5 |
| r7 = 124.718 | d7 = Variable | | |
| r8 = 74.848 | d8 = 1.05 | n5 = 1.88300 | ν5 = 40.8 |
| r9 = 9.648 | d9 = 4.99 | | |
| r10 = −28.759 | d10 = 0.95 | n6 = 1.88300 | ν6 = 40.8 |
| r11 = 46.134 | d11 = 0.20 | | |
| r12 = 23.285 | d12 = 2.75 | n7 = 1.92286 | ν7 = 18.9 |
| r13 = −108.773 | d13 = 0.85 | n8 = 1.88300 | ν8 = 40.8 |
| r14 = 49764.000 | d14 = Variable | | |
| r15 = ∞ (Aperture Stop) | d15 = 7.10 | | |
| r16 = −27.953 | d16 = 0.80 | n9 = 1.83481 | ν9 = 42.7 |
| r17 = 43.930 | d17 = 2.55 | n10 = 1.80518 | ν10 = 25.4 |
| r18 = −43.930 | d18 = 0.46 | | |

-continued f = 4.63~91.59 FNo = 1: 1.66~3.50 2ω = 65.9°~3.8°

| | | | |
|---|---|---|---|
| r19 = 18.287 (Aspherical Surface) | d19 = 4.55 | n11 = 1.58313 | ν11 = 59.4 |
| r20 = −30.708 | d20 = 0.85 | n12 = 1.80610 | ν12 = 40.9 |
| r21 = 30.708 | d21 = 1.10 | | |
| r22 = 657.550 | d22 = 2.10 | n13 = 1.69680 | ν13 = 55.5 |
| r23 = −31.453 | d23 = Variable | | |
| r24 = 57.206 | d24 = 2.20 | n14 = 1.69680 | ν14 = 55.5 |
| r25 = −57.207 | d25 = 0.20 | | |
| r26 = 24.648 | d26 = 0.85 | n15 = 1.84666 | ν15 = 23.9 |
| r27 = 11.500 | d27 = 4.45 | n16 = 1.69680 | ν16 = 55.5 |
| r28 = 90.246 | d28 = Variable | | |
| r29 = ∞ | d29 = 20.00 | n17 = 1.58913 | ν17 = 61.1 |
| r30 = ∞ | d30 = 3.75 | n18 = 1.51633 | ν18 = 64.1 |
| r31 = ∞ | | | |

| | Focal Length | | |
|---|---|---|---|
| Variable Distance | 4.63 | 27.04 | 91.59 |
| d7 | 0.75 | 33.54 | 44.47 |
| d14 | 46.32 | 13.54 | 2.61 |
| d23 | 10.04 | 6.19 | 11.93 |
| d28 | 4.00 | 7.85 | 2.11 |

Aspherical Coefficient

| | K | B | C | D | E | F |
|---|---|---|---|---|---|---|
| 19-th Surface | −1.4009e+00 | 4.3572e−06 | 3.5048e−08 | −2.7743e−10 | 3.2092e−12 | −1.1219e−14 |

NUMERICAL EXAMPLE 3 f = 4.64~91.66 FNo = 1: 1.66~3.50 2ω = 65.8°~3.7°

| | | | |
|---|---|---|---|
| r1 = 418.218 | d1 = 2.75 | n1 = 1.80610 | ν1 = 33.3 |
| r2 = 61.070 | d2 = 10.14 | n2 = 1.49700 | ν2 = 81.5 |
| r3 = −211.101 | d3 = 0.28 | | |
| r4 = 66.978 | d4 = 6.33 | n3 = 1.43387 | ν3 = 95.1 |
| r5 = −1942.773 | d5 = 0.20 | | |
| r6 = 43.959 | d6 = 4.74 | n4 = 1.71300 | ν4 = 53.9 |
| r7 = 116.327 | d7 = Variable | | |
| r8 = 61.873 | d8 = 1.05 | n5 = 2.00330 | ν5 = 28.3 |
| r9 = 9.922 | d9 = 4.96 | | |
| r10 = −24.612 | d10 = 0.95 | n6 = 1.88300 | ν6 = 40.8 |
| r11 = 75.967 | d11 = 0.20 | | |
| r12 = 27.315 | d12 = 3.28 | n7 = 1.92286 | ν7 = 18.9 |
| r13 = −34.100 | d13 = 0.85 | n8 = 1.71300 | ν8 = 53.9 |
| r14 = −552.544 | d14 = Variable | | |
| r15 = ∞ (Aperture Stop) | d15 = 7.11 | | |
| r16 = −26.123 | d16 = 0.80 | n9 = 1.77250 | ν9 = 49.6 |
| r17 = 26.123 | d17 = 2.99 | n10 = 1.76182 | ν10 = 26.5 |
| r18 = −47.331 | d18 = 0.50 | | |
| r19 = 22.268 (Aspherical Surface) | d19 = 4.50 | n11 = 1.58313 | ν11 = 59.4 |
| r20 = −24.734 | d20 = 0.85 | n12 = 1.74950 | ν12 = 35.3 |
| r21 = 39.354 | d21 = 0.91 | | |
| r22 = 63530.076 | d22 = 1.90 | n13 = 1.80400 | ν13 = 46.6 |
| r23 = −35.821 | d23 = Variable | | |
| r24 = 72.458 | d24 = 1.81 | n14 = 1.83481 | ν14 = 42.7 |
| r25 = −72.458 | d25 = 0.20 | | |
| r26 = 25.017 | d26 = 0.85 | n15 = 1.92286 | ν15 = 18.9 |
| r27 = 13.117 | d27 = 3.89 | n16 = 1.69680 | ν16 = 55.5 |
| r28 = 162.330 | d28 = Variable | | |
| r29 = ∞ | d29 = 20.00 | n17 = 1.58913 | ν17 = 61.1 |
| r30 = ∞ | d30 = 3.75 | n18 = 1.51633 | ν18 = 64.1 |
| r31 = ∞ | | | |

-continued f = 4.64~91.66 FNo = 1: 1.66~3.50 2ω = 65.8°~3.7°

| Variable Distance | Focal Length | | |
|---|---|---|---|
| | 4.64 | 26.40 | 91.66 |
| d7 | 0.75 | 32.74 | 43.40 |
| d14 | 45.29 | 13.31 | 2.65 |
| d23 | 10.18 | 6.94 | 13.07 |
| d28 | 4.34 | 7.58 | 1.45 |

| | Aspherical Coefficient | | | | | |
|---|---|---|---|---|---|---|
| | K | B | C | D | E | F |
| 19-th Surface | −1.6545e+00 | −5.2826e−07 | 2.6618e−08 | −2.2849e−10 | 1.7396e−12 | 5.6431e−16 |

TABLE 1

| | Numerical Example 1 | Numerical Example 2 | Numerical Example 3 |
|---|---|---|---|
| (1) | 46.0 | 44.7 | 42.8 |
| (2) | 81.5 | 81.5 | 81.5 |
| (3) | 95.1 | 95.1 | 95.1 |
| (4) | 1.713 | 1.697 | 1.713 |
| (5) | 18.9 | 18.9 | 18.9 |
| Z | 19.8 | 19.8 | 19.8 |

Next, an exemplary embodiment of a video camera using the zoom lens according to the present invention as an imaging optical system is described with reference to FIG. 13.

If FIG. 13, a video camera body 10 and an imaging optical system 11 constituted by the zoom lens according to the exemplary embodiment of the present invention are shown. A solid-state image pickup element (photoelectric conversion element) 12, such as a CCD sensor or a CMOS sensor, detects an object image formed through the imaging optical system 11. A memory 13 stores information corresponding to the object image which is photoelectrically converted by the image pickup element 12. A finder 14 allows a user to view the object image displayed on a display element (not shown).

By applying the zoom lens according to the present invention to the image pickup apparatus such as a video camera, the image pickup apparatus may be compact and have a high optical performance.

Also, the zoom lens according to the embodiment of the present invention may be applied to a digital still camera.

With the zoom lens and the image pickup apparatus of the embodiments as described above, the compact zoom lens having the high zoom ratio, and the high optical performance over the entire zooming range can be provided. Further, with the embodiments, the zoom lens allows the entire optical system to be reduced in size, causes less decentration aberration when the image stabilization lens unit is decentered, and has a high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-151545 filed May 31, 2006, which is hereby incorporated by reference herein in its entirety.

What is claimed is:

1. A zoom lens comprising:
a first lens unit of positive refractive power;
a second lens unit of negative refractive power;
a third lens unit of positive refractive power; and
a fourth lens unit of positive refractive power, being disposed in that order from an object side to an image side, wherein
the second and fourth lens units are moved in a direction parallel with an optical axis of the zoom lens during zooming,
the first lens unit consists of one negative lens and three or fewer positive lenses, being disposed in that order from the object side to the image side, and
the following condition is satisfied:

$25.1 < Z \times BD1/BD2 < 4.1 \times Z$, where BD1 and BD2 are lengths of the first and second lens units along the optical axis, and Z is a zoom ratio.

2. The zoom lens according to claim 1, wherein
the third lens unit comprises a third-a lens sub-unit of negative refractive power and a third-b lens sub-unit of positive refractive power, being disposed in that order from the object side to the image side, and
the third-b lens sub-unit is moved in a direction orthogonal to the optical axis so as to shift an image.

3. The zoom lens according to claim 2, wherein the third-b lens sub-unit comprises a positive lens including an aspherical surface, a negative lens, and a positive lens, being disposed in that order from the object side to the image side.

4. The zoom lens according to claim 1, wherein
the first lens unit consists of a negative lens G11, a positive lens G12, a positive lens G13, and a positive lens G14, being disposed in that order from the object side to the image side,
at least one of the following conditions are satisfied:

$75 < vdG12$, $65 < vdG13$, $1.601 < NdG14 < 1.811$, where vdG12 and vdG13 are Abbe numbers of materials of the positive lenses G12 and G13, and NdG14 is a refractive index of a material of the positive lens G14.

5. The zoom lens according to claim 1, wherein
the second lens unit has a negative lens, and at least one positive lens G2p on the image side of the negative lens, and the following condition is satisfied:

$$\nu dG2p < 23.5,$$

where $\nu dG2p$ is an Abbe number of a material of the positive lens G2p.

6. The zoom lens according to claim 5, wherein the positive lens G2p is affixed to a negative lens.

7. The zoom lens according to claim 1, wherein the first lens unit consists of the negative lens and three positive lenses.

8. The zoom lens according to claim 1, wherein the zoom lens consists of four lens units.

9. The zoom lens according to claim 1, wherein the zoom lens is adapted to form an image of an object on a solid-state image pickup element.

10. An image pickup apparatus comprising:
a solid-state image pickup element; and
a zoom lens arranged to form an image of an object on the solid-state image pickup element, wherein
the zoom lens includes:
a first lens unit of positive refractive power;
a second lens unit of negative refractive power;
a third lens unit of positive refractive power; and
a fourth lens unit of positive refractive power, being disposed in that order from an object side to an image side,
the second and fourth lens units are moved in a direction parallel with an optical axis of the zoom lens during zooming,
the first lens unit consists of one negative lens and three or fewer positive lenses, being disposed in that order from the object side to the image side, and
the following condition is satisfied:

$$25.1 < Z \times BD1/BD2 < 4.1 \times Z,$$

where BD1 and BD2 are lengths of the first and second lens units along the optical axis, and Z is a zoom ratio.

* * * * *